July 2, 1963 L. J. ELLIOTT ETAL 3,096,472
STATIC INVERTER CIRCUIT
Filed Sept. 2, 1958 3 Sheets-Sheet 1
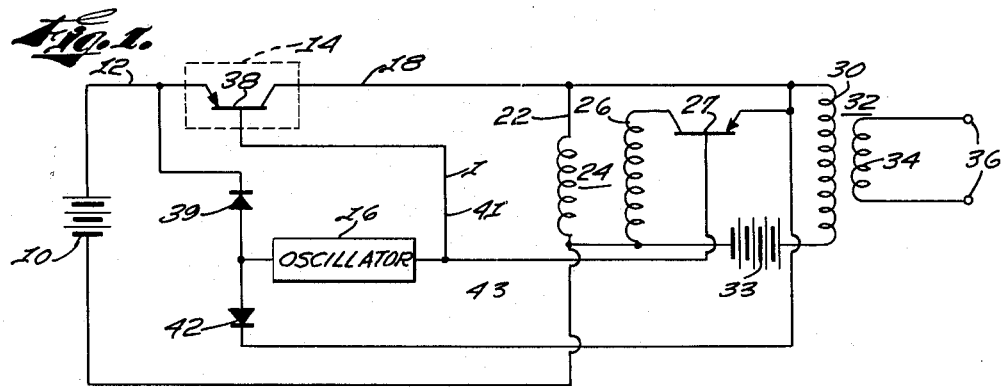
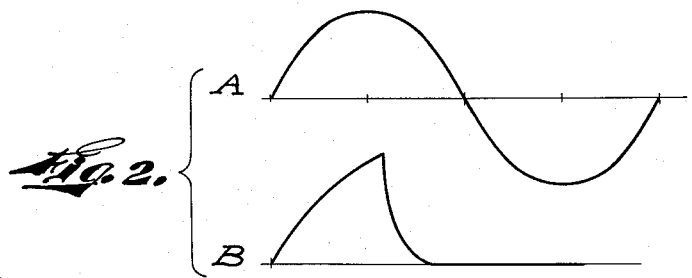
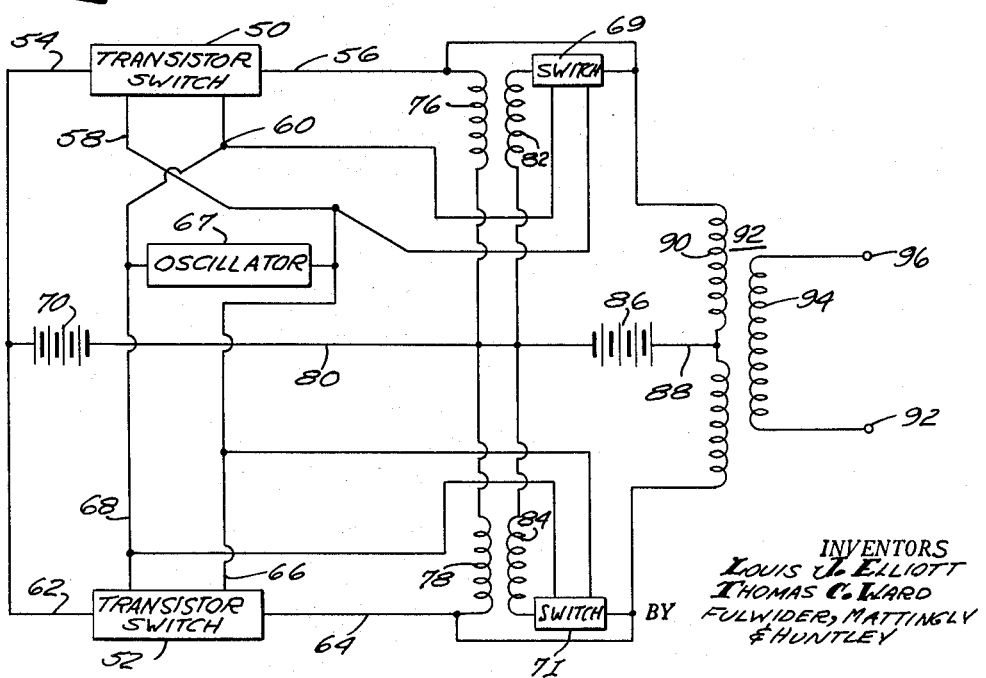
INVENTORS
LOUIS J. ELLIOTT
THOMAS C. WARD
BY FULWIDER, MATTINGLY
& HUNTLEY
ATTORNEYS

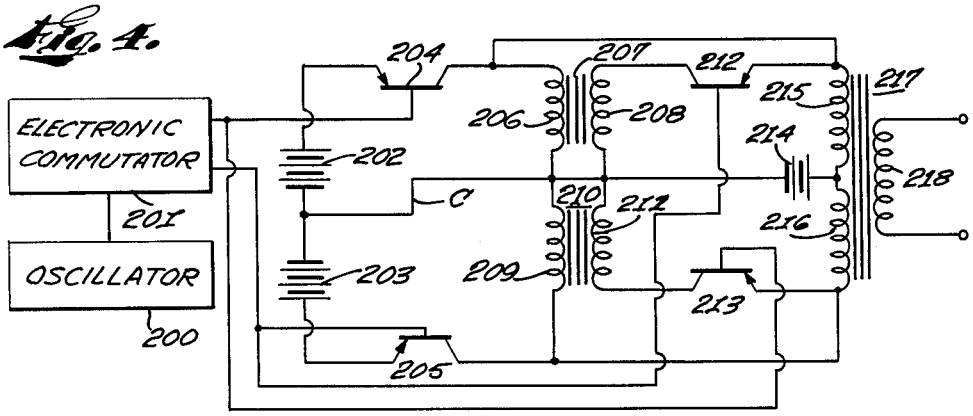
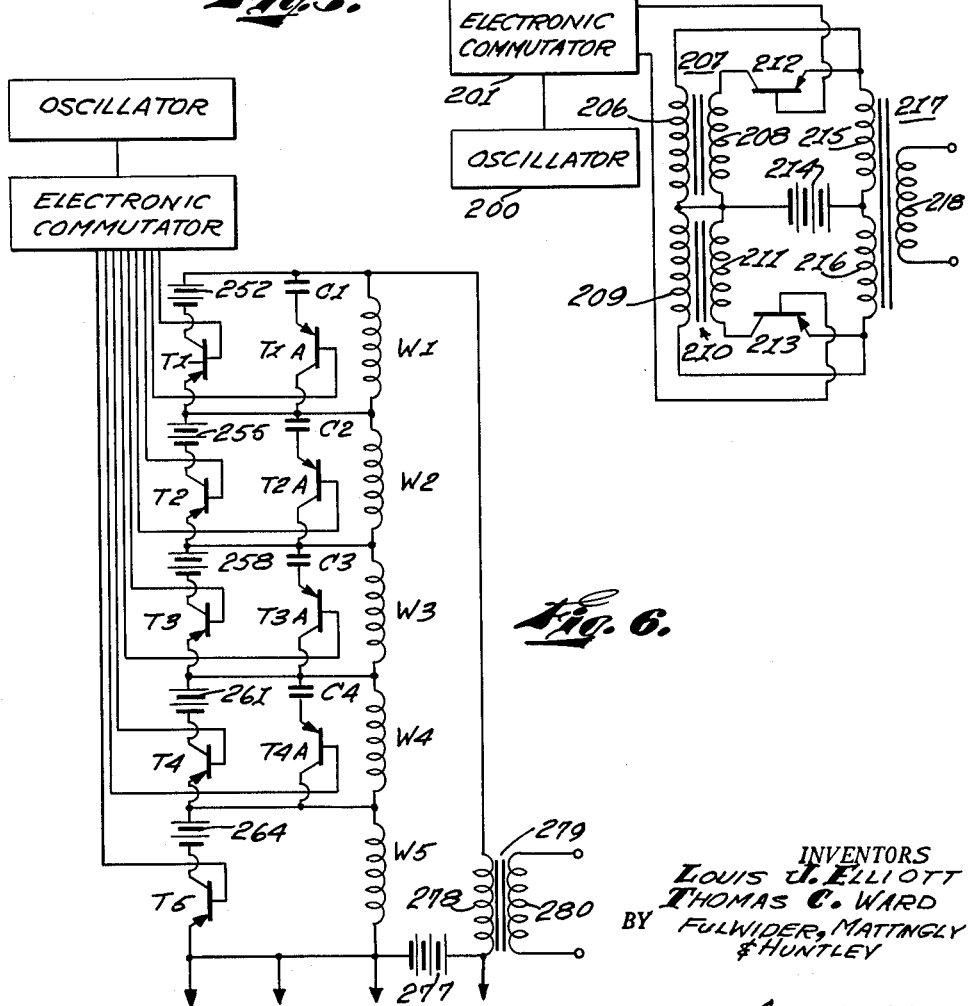

July 2, 1963  L. J. ELLIOTT ETAL  3,096,472
STATIC INVERTER CIRCUIT
Filed Sept. 2, 1958  3 Sheets-Sheet 3

INVENTORS
LOUIS J. ELLIOTT
THOMAS C. WARD
BY FULWIDER, MATTINGLY
& HUNTLEY

ATTORNEYS

3,096,472
STATIC INVERTER CIRCUIT
Louis J. Elliott and Thomas C. Ward, Encinitas, Calif., assignors to Kinetics Corporation, Solana Beach, Calif., a corporation of California
Filed Sept. 2, 1958, Ser. No. 758,230
6 Claims. (Cl. 321—45)

The present invention relates to electrical inverter circuits, and more particularly to such circuits which employ passive circuit elements for converting direct-current electrical energy into alternating-current electrical energy.

Inverter circuits are widely employed in conjunction with various electrical systems to convert direct-current electrical energy into alternating-current electrical energy. For example, 400-cycle alternating-current energy is widely used in the electrical systems of various aircraft and missiles. Air-borne units of this type sometimes employ storage batteries as a source of electrical energy; therefore, the energy is supplied in a direct-current form. Thus, in this exemplary application, an inverter is required to convert electrical energy from a battery into an alternating-current form.

Various types of electrical inverters have been proposed in the past; however, in general, previous inverters have had certain limitations or undesirable characteristics. For example, one common class of inverters employs rotating machinery, and as a result these are generally somewhat bulky and heavy. Furthermore, rotary inverters also have the disadvantages generally attendant systems incorporating moving parts.

Inverters have also been proposed which employ vacuum tubes to perform the necessary switching operation in the energy conversion. However, vacuum tubes often fail when subjected to the extreme environmental conditions encountered by air-borne apparatus and are generally of limited durability. Electrical inverters have also been constructed using transistors as a switching means; however, such systems often require complex circuitry and, furthermore, the power which may be provided is normally limited to the power capabilities of the transistors, and efficiency is generally poor.

In general, the present invention comprises an electrical inverter wherein an inductance is connected to a source of direct-current energy and means are provided for inducing a varying voltage in the inductance which is opposed to the direct-current energy. As a result, a fluctuating current flows in the inductance which may be passed through the primary winding of a transformer to provide alternating-current power at the secondary winding of the transformer. The means employed to induce the varying voltage in the inductance may include a transistor switching network connected to a winding which is inductively coupled to the inductance to control the effective impedance thereof.

It is an object of the present invention to provide an improved inverter circuit which requires a limited number of components and which is capable of handling large amounts of electrical power.

It is another object of the present invention to provide a reliable inverter circuit utilizing passive circuit elements, which circuit is efficient, inexpensive to manufacture, and capable of withstanding severe environmental conditions.

It is a further object of the present invention to provide an inverter circuit employing various solid-state electrical devices to perform a switching operation in conjunction with a source of high frequency electrical energy, whereby a limited amount of energy is required to effect the conversion of direct-current electrical energy into alternating-current electrical energy.

It is another feature of the present invention to utilize a control circuit in junction with an inductance, for controlling the effective value of the inductance in converting direct-current energy into alternating-current energy.

Still a further object of the present invention is to provide an inverter circuit capable of handling large power values and employing solid state devices which need be capable of handling only low power.

Other and incidental objects and advantages of the present invention will become apparent from a consideration of the following specification and the accompanying drawing in which:

FIGURE 1 is a schematic circuit diagram of one embodiment of an electrical inverter constructed in accordance with the principles of the present invention;

FIGURE 2 shows various wave forms indicative of signals formed in the circuit represented in FIGURE 1;

FIGURE 3 is a schematic circuit diagram of another embodiment of an electrical inverter constructed in accordance with the present invention;

FIGURE 4 is a schematic circuit diagram of still another embodiment of the present invention;

FIGURE 5 is a schematic circuit diagram of further embodiment of the present invention;

FIGURE 6 is a schematic circuit diagram of a still further embodiment of the present invention;

Figure 7:
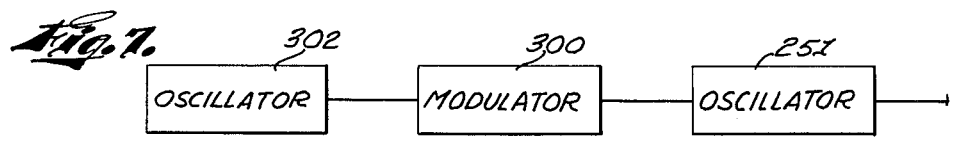
FIGURE 7 is a schematic circuit diagram of an alternative form of input to the electronic commutator of FIGURE 6, and forming a further embodiment of the present invention.

Referring to the drawings, and initially to FIGURE 1, there is shown an inverter circuit which will be preliminarily considered to illustrate certain operating principles. FIGURE 1 shows a battery 10, the positive output from which is connected through a conductor 12 to a transistor switch 14. The transistor switch 14 is connected to be controlled by an oscillator 16, which may, for example, operate at a frequency of 400 cycles per second. The output from the transistor switch 14 is applied through a conductor 18 to an inductance or winding 22. A winding 26 is inductively-coupled to the winding 22 to form a transformer 24. The winding 26 is serially-connected with a transistor 27, the primary winding 30 of a transformer 32, and a battery 33. Transformer 32 has a secondary winding 34, adapted to be connected to an output circuit through terminals 36. The transistor 27 functions as a switch, under control of the oscillator 16, as will be described hereinafter.

Various forms of switching arrangements may be provided as for the switch 14; however, the exemplary circuit employs a single transistor 38. The emitter electrode of the transistor 38 is connected through a diode 39 to the oscillator, and the base electrode is connected through a return conductor 41 to the oscillator. Therefore, as the oscillator 16 operates, the transistor 38 is opened and closed as a switch in accordance with well-known transistor-switching techniques. In the event that a more-detailed consideration of the operation of the transistor switch 14 is desired, reference may be had to "Communication and Electronics," a publication of the American Institute of Electrical Engineers, for March 1955.

For the present disclosure, which employs one particular type of transistor circuit it is simply important to appreciate that current may pass from the conductor 12 to the conductor 18 only when the base electrode of the transistor 38 is more negative than the emitter electrode. Therefore, the transistor switch 14 may be seen to provide a closed circuit during one-half cycle of the oscillator 16, and an open circuit during the other half cycle.

The transistor 27 is operated as a switch in a fashion similar to the transistor 38. To accomplish this operation the emitter electrode of the transistor 27 is connected through a diode 42 to the oscillator 16, and the oscillator is connected by a return conductor 43 to the base of the transistor 27.

The manner of operation of the illustrative embodiment of FIGURE 1 will now be considered with reference to the wave forms of FIGURE 2. FIGURE 2A illustrates a single cycle of the sinusoidal wave form of oscillator 16, one-half cycle of which is applied to the transistor switch 14 through the diode 39, to allow a current to pass through the conductor 18, substantially as shown in FIGURE 2B. That is, the transistor switch 14 (driven by the oscillator 16) permits current from battery 10 to flow from the conductor 12 to the conductor 18 during only one-half cycle of the oscillator 16. The voltage developed across the winding 22 opposes the voltage of the battery 33; therefore, current which would normally flow from the battery 33 through the windings 30 and 22 is opposed by the voltage induced in the winding 22 and the flow of current through the winding 22 is essentially stopped. Therefore, a fluctuating current flows in the winding 30 which induces a voltage in the output winding 34, which may be supplied from terminals 36.

It is to be noted that in the operation of the circuit of FIGURE 1, the current drawn from the oscillator 16 and the battery 10 is quite small because the winding 22 presents a substantial impedance to the current pulses in the conductor 18. That is, transistor 38 conducts for such a short length of time that the current does not rise to more than a small fraction of what it would attain if transistor 38 were closed for a substantial period.

As previously indicated, the transistor 27 closes during alternate half cycles of oscillator 16 with the transistor 38. Closure of the transistor 27 allows current to flow through winding 26 to oppose the magnetic field set up by the current flowing from the battery 33 through the winding 22. Therefore, during one-half cycle of oscillator 16, current flows through the transistor 38 and the winding 22. This current is prevented from reaching a high value by the inductance of the winding 22; however, the voltage appearing across winding 22 blocks current which would normally flow from the battery 33 through the winding 22. During the next half cycle of oscillator 16, the transistor 38 opens, and the blocking voltage developed across winding 22 is removed allowing current to flow through battery 33 and winding 22. During this interval, the transistor 27 is closed and current flows through winding 30. The current in the winding 30 therefore reaches a high value in that the winding 22 now presents a low inductance.

Although the ampere turns of winding 22 may coincide with the ampere turns of winding 26, the number of turns of winding 26 is considerably greater than the number of turns on winding 22; therefore, during the half cycle when the oscillator 16 closes the transistor 27, and current flows through the battery 33, the current through transistor 27 is quite low.

Referring now to FIGURE 3, there is shown a push-pull inverter circuit which provides alternating-current electrical energy from a direct-current source of electrical energy. There are shown a pair of transistor switches 50 and 52 which may be constructed similar to the transistor switch 14 shown in detail in FIGURE 1, and operate in a similar manner.

The transistor switch 50 passes current between conductors 54 and 56 when conductor 58 is more-positive than conductor 60. Similarly, the transistor switch 52 passes a current from conductor 62 to conductor 64 when conductor 68 is more positive than conductor 66. Thus, the switches 50 and 52 are alternately closed under control of an oscillator 67. Switches 69 and 71 are also connected to be controlled by the oscillator 67. Switch 69 is closed while switch 50 is open, and switch 71 is closed while switch 52 is open.

The input conductors 54 and 62 to the switches 50 and 52, respectively, are connected to the positive terminal of a battery 70, and the output conductors 56 and 64 are connected through windings 76 and 78, respectively, to a common conductor 80 which is connected back to the battery 70.

The conductors 58 and 66, which carry switching current to the transistor switches 50 and 52, are connected to one terminal of the oscillator 67 while the conductors 60 and 68 are connected to the other terminal of the oscillator 67.

The windings 76 and 78 are individually inductively coupled to windings 82 and 84; however, the latter have several times as many turns, in order that a smaller current through windings 82 and 84 will reduce the field that would otherwise have been produced by current in windings 76 or 78. One terminal of each of the windings 82 and 84 is connected through one of the switches 69 and 71 to the external terminals of the primary winding 90 of a transformer 92 which terminals are also individually connected to the end terminals of the windings 76 and 78, respectively. The center tap of the primary winding 90 is connected to the terminal of the battery 86. The secondary winding 94 of the transformer 92 is connected across output terminals 96 at which alternating-current power appears in the operation of the circuit.

The operation of the inverter system shown in FIGURE 3 will now be considered. The sinusoidal-wave form signal of the oscillator 67 is applied to all the transistor switches 50, 52, 69 and 71. During the first (positive) half cycle of the wave form, the transistor switch 50 is closed and current from the battery 70 is permitted to pass through the conductor 54, the transistor switch 50, the conductor 56, and the winding 76. During this interval, the switch 69 is open and the switch 71 is closed. During the second (negative) half cycle of the oscillator 67, switches 52 and 69 are closed and the switches 50 and 71 are opened. As a result, a current passes from the battery 70, through the conductor 62, the transistor switch 52, the line 64, and the winding 78.

It may, therefore, be seen that as fluctuations in current occur through windings 76 and 78, fluctuating currents are set up in the winding 90 to produce an alternating voltage across the output terminals 96. The short time interval that the transistor switches 50 and 52 are closed results in the windings 76 and 78 limiting the time-rate of rise of the currents through the conductors 56 and 64, and thereby restricting the power drain from the battery 70. However, the voltages across the windings 76 and 78 are opposed to the voltage of the battery 86, and as a result, the direct current which would normally flow in each half of the primary winding of the transformer 92 is limited by voltages induced in windings 76 and 78. The winding 90 is such that current through one-half will magnetize the core of transformer 92 in one direction and current through the other half will magnetize it in the other direction. Thus the composite result of the individual currents in the primary winding 90 induces a sinusoidal wave form in the winding 94, which may be applied to a load connected across terminals 96.

In the operation of the system of FIGURE 3, the battery 86 provides alternating-current energy at the terminals 96 at the frequency of the oscillator 67, and the elements actually handling this power include only the windings 76 and 78 and the transformer 90. As a result, the switching system employed to induce variable voltages in the windings 76 and 78 may employ elements having limited power-handling capabilities such as transistors. This consideration results in considerable economy in space, cost, reliability and efficiency.

Referring now to FIGURE 4, there is shown an alternate form of the inverter circuit of the present invention. In the system of FIGURE 4, an oscillator 200 controls an electronic commutator 201 to sequentially apply a signal to the base electrodes of transistors 204 and 205. The commutator 201 may be similar to that shown and described in a pending U.S. patent application of Thomas C. Ward, Static Commutator System, Serial No. 750,964, filed July 25, 1958, now U.S. Patent No. 3,082,330. The emitter electrodes of the transistors 204 and 205 are connected respectively through batteries 202 and 203 to a common line C. The collector electrodes of the transistors 204 and 205 are connected respectively through windings 206 and 209 to the common circuit C. The windings 206 and 209 are individually inductively coupled to windings 208 and 211 to form transformers 207 and 210.

The windings 208 and 211 have one terminal connected through the common circuit C to a battery 214, and another terminal connected to transistors 212 and 213 which are in turn connected to interconnected windings 215 and 216 which are connected to the battery 214. The windings 215 and 216 are inductively coupled to an output winding 218, of a transformer 217.

In the operation of the system of FIGURE 4, the blocking voltage appears first across winding 206 and then across winding 209. It is apparent that current from the battery 214 will flow through a particular winding only when a blocking voltage does not appear across that winding. The time interval during which current from battery 214 flows or does not flow is determined by the oscillator 200 and electronic commutator 201. The commutator 201 receives a stream of electrical impulses and transmits them according to a predetermined plan. For example, in the case of a 400 cycle inverter, the blocking voltage would appear across winding 206 for 1.25 milliseconds, or one-half of the 400 cycle wave. During this particular half cycle, current from battery 214 flows through winding 209. During the next 1.25 milliseconds comprising the remaining half of the 400 cycle wave, transistor 205 closes and the blocking voltage appears across winding 209, causing the power current from battery 214 to cease. During this same time interval, transistor 204 opens, removing the blocking voltage across winding 206 and allowing current from battery 214 to flow through it. When transistor 204 is open and current from battery 214 is flowing through winding 206, transistor 212 is closed, allowing current to flow through winding 208. This winding is so connected that its magnetic field opposes that of winding 206. Although much less current flows through winding 208 than winding 206, the former has many more turns; therefore, the ampere-turns of winding 206 is approximately equal to the ampere-turns of winding 208. The effective inductance presented by transformer 207 is thus largely nullified and the rise of current through battery 214 and winding 215 is much less restricted by the inductance of 207 than would be the case without winding 208. Also, when the blocking voltage again appears across winding 206, very little induced voltage appears across winding 206. At this time, transistor 212 opens, causing the current in winding 208 to cease but, again, the cancelling action just described essentially prevents an induced voltage from appearing across winding 208. The transistor 213 and the winding 211 perform the same functions in the other half of the push-pull circuit in conjunction with transformer 210.

FIGURE 5 is a similar embodiment to that of FIGURE 4 and similar parts are identified by like reference numerals. In the system of FIGURE 5, the blocking voltage is induced, while in the system of FIGURE 4 it is not.

When the transistor 212 is closed, current flows from the battery 214 through windings 206 and 208. These windings are connected so that their respective magnetic fields oppose and cancel each other, transformer 207 is therefore electrically (in this circuit), very similar to a resistor. When transistor 212 opens, the cancelling current through winding 208 ceases, and a positive voltage appears across winding 206 which is applied to winding 215 of the output transformer 217. Current through winding 206 is severely restricted by the inductance which is not cancelled out until transistor 212 closes again. Transistors 212 and 213 close alternately so that current flows through windings 208 and 211 alternately in typical push-pull fashion. As before, the time interval that either transistor 212 or 213 is closed is dictated by the desired output frequency and controlled by the electronic commutator 201 and the oscillator 200. For example, in the case of a 2000 c.p.s. output, transistor 212 would be closed for 250 microseconds and open 250 microseconds. If a sine wave output is desired, the turning on and off of transistors 212 and 213 is accomplished on a sine wave instead of abruptly as described above. Thus, the current through winding 215 stops and starts gradually on a sine wave shaped curve.

Referring now to FIGURE 6, a system is shown in which the blocking voltage is applied sequentially to a series of circuits somewhat similar to those previously described. The voltage is applied first across a winding W1 then across a winding W2, then W3, and so on. Any number of windings may be used. The "on" time for each transistor T is much less than that in FIGURE 5, for example, the current through the windings W will be much less; therefore, losses in the blocking circuit will be less.

Consider a 400 cycle unit in which each half cycle is 1.25 milliseconds. The sequence of operations is as follows: transistor T1 closes placing the blocking voltage across winding W1 preventing current from flowing through a battery 277 and winding 278 of output transformer 280. Transistor T1 remains closed for 0.25 millisecond, and as soon as it opens, transistors T2 and T1A close. The closing of T2 places the blocking voltage across winding W2 again preventing current from the battery 277 from flowing through winding 278. The closing of transistor T1A which occurred simultaneously with the closing of T2, allows the energy in the magnetic field set up by current through winding W1 to charge capacitor C1. The capacitor C1 is chosen to receive essentially all the above energy in about 0.25 millisecond.

The energy in capacitor C2 remains stored. The opening of transistor T2 removes the blocking voltage from winding W2. At this instant, transistors T3 and T2A close placing the blocking voltage across winding W3 and allowing the energy in the magnetic field built up by the current in winding W2 to be stored in capacitor C2. At the end of another 0.25 millisecond, transistors T3 and T2A open and transistors T4 and T3A close. The sequence of operations remain the same until transistor T5 opens 1.25 milliseconds from the beginning of this description. At this instant, transistors T1A, T2A, T3A and T4A close simultaneously. Current flows through battery 277, winding W1, W2, W3, W4, and W5. Also from 278 through capacitors C1, C2, C3, and C4 and transistors T1A, T2A, T3A, and T4A. This flow of current continues all through the second half of the 400 cycle wave or 1.25 milliseconds. The energy stored in the various blocking windings W, is thus returned to the power circuit.

It is to be noted that a transistor and capacitor combination is not provided across the last winding in the series, in this case, W5, since there is no delay between the removal of the blocking voltage from W5 and the flow of current from battery 277. The magnetic energy at winding W5 is immediately returned to the circuit. In the above description, only one-half of the push-pull circuit has been described. The operation of the other half is identical and takes place during the second half of the 400 cycle wave, or 1.25 milliseconds.

FIGURE 7 shows a variation of FIGURE 6 in which the blocking voltages, instead of being turned off abruptly, are modulated at the output frequency. Thus, the blocking voltages are turned on and off gradually. According to the variation circuit of FIGURE 7, the oscillator 251 is preceded by an oscillator 302 followed by a modulator 300. The electronic commutator 250 and the remainder of the circuit are omitted in FIGURE 7 for clarity. The oscillator 251 which is of comparatively high frequency, is modulated by a conventional modulator 300, FIGURE 7, at the frequency determined by a conventional oscillator 302, to produce the effect described.

Figure 8:
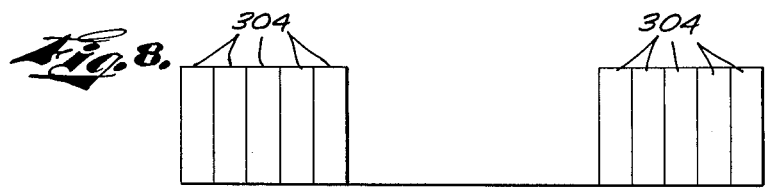
FIGURE 8 illustrates wave forms indicative of electrical signals formed in the circuit represented in FIGURE 6.
Figure 9:
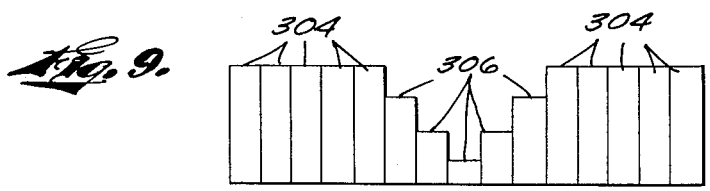
FIGURE 9 illustrates wave forms indicative of electrical signals formed in the circuit represented in FIGURE 7.

For comparison, FIGURES 8 and 9 illustrate subsequentially the wave forms produced by the embodiments of FIGURES 6 and 7, respectively It is noted that the unmodulated blocking voltages 304 appear on one side of the push-pull circuit of FIGURE 6, while the modulated blocking voltages 306 appear on the opposite side of the push-pull circuit, this opposite side having been omitted from FIGURE 6 for brevity. In the next half cycle the positions of the modulated and unmodulated voltages will be reversed from that just described.

Figure 10:
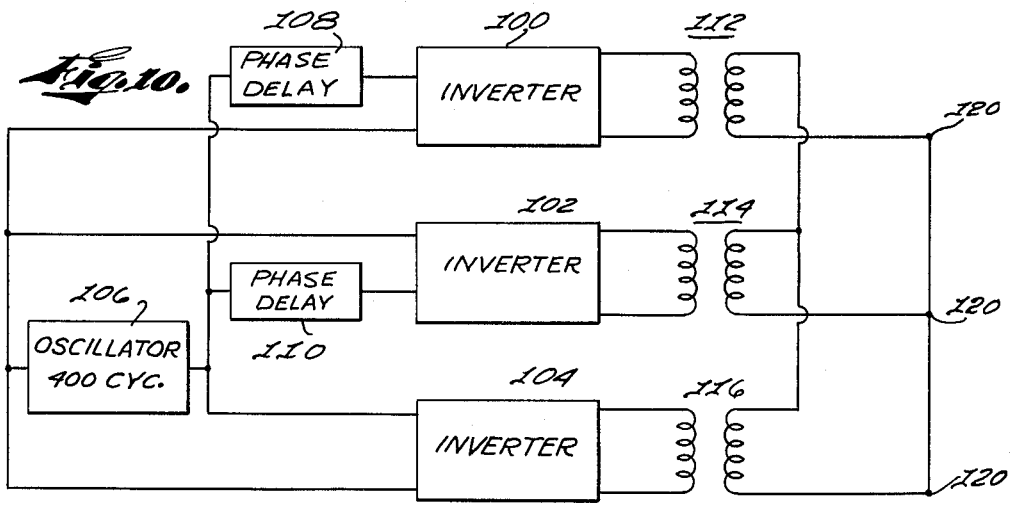
FIGURE 10 is a block diagrammatic-representation of a three-phase electrical inverter constructed in accordance with the principles of the present invention.

The system of the present invention may be readily constructed to provide three-phase alternating-current power by employing three separate inverters as shown in FIGURE 10. The inverters 100, 102 and 104 are similar to the inverter circuits described above; however, the oscillator 200 and commutator 201 as shown in FIGURE 5 are removed from each of the inverters and replaced by an oscillator 106 which functions in conjunction with phase-shift circuits 108 and 110. The output from the oscillator 106 is connected directly to the inverter circuit 104 and is connected through the phase-shift circuit 110 to the inverter 102 and through the inverter circuit 108 to the inverter circuit 100. The phase-shift circuit 110 provides a phase delay of 120 degrees while the phase-shift circuit 108 provides a phase delay of 240 degrees. As a result, the inverter circuits 100, 102 and 104 function to provide three alternating-current voltages which are phase-displaced by 120 degrees. The output terminals of the inverters 100, 102, and 104 are connected respectively to the primary winding of transformers 112, 114 and 116. The secondary windings of each of the transformers 112, 114 and 116 are connected in a Y or delta configuration and provide three-phase power at output terminals 120.

An important feature of the present invention is the provision of a system capable of converting direct-current power into alternating-current power of a desired frequency, which system employs passive elements in the high power portions of this circuit, and in which system a relatively high degree of efficiency and reliability is obtained.

It should be noted that although the particular embodiment of the invention herein shown and described is fully capable of providing the advantages and achieving the objects herein previously set forth, such embodiment is merely illustrative and this invention is not to be limited to the details of construction illustrated and described herein except as defined in the appended claims.

We claim:

1. A static inverter comprising: a pair of direct-current voltage sources an impedance device and an inductance in circuit with one of said sources; means for automatically periodically changing the impedance of said impedance device to establish a varying D.-C. current that creates a fluctuating voltage across said inductance, said means including an oscillator; switch means operable by said oscillator to alternately connect the other source across said impedance device; and output circuit means coupled to said inductance.

2. A static inverter comprising: a D.-C. voltage source; an impedance device and an inductance in circuit with said source; means for automatically periodically changing the impedance of said impedance device to establish a varying direct current that creates a fluctuating voltage across said inductance, said impedance changing means including a second direct-current source; an electrically operable switch for connecting said second direct-current source in circuit with said impedance device; oscillator means for cyclically opening and closing said switch; and output circuit means coupled to said inductance.

3. A static inverter as defined in claim 2, wherein said direct-current sources are connected so that, when said switch is closed, they are in polarity opposing relation.

4. A static inverter as defined in claim 3, wherein said direct-current sources are characterized as sources of substantially equal voltage.

5. A static inverter as defined in claim 4, including a further electrically operable switch coupled to said first-mentioned direct-current voltage source and operable by the oscillator means; and means operable through said further switch upon closure thereof to induce a voltage in said inductance so as to reduce its effective impedance.

6. A multi-phase inverter comprising: respective networks each including a direct-current voltage source; a respective impedance device to be connected in circuit with each source; inductance means in circuit with each impedance device; a further direct-current voltage source in circuit with said inductance means; means for automatically periodically changing the impedance of each impedance device to establish a varying direct-current that creates a fluctuating voltage across said inductance means, said impedance changing means being operable to change the impedances of said devices in a predetermined order; said impedance changing means including respective electrically operable switch means for connecting the associated direct-current sources and impedance devices in circuit; means for alternately opening and closing said switch means in said predetermined order; and a single output circuit means coupled to said inductance means.

References Cited in the file of this patent

UNITED STATES PATENTS

| | | |
|---|---|---|
| 1,708,530 | Von Arco | Apr. 9, 1929 |
| 2,555,770 | Stockinger | June 5, 1951 |
| 2,663,561 | Hewlett | Mar. 31, 1953 |
| 2,804,547 | Mortimer | Aug. 27, 1957 |
| 2,860,300 | Sampietro | Nov. 11, 1958 |
| 2,894,210 | Erb | July 7, 1959 |
| 2,978,626 | Dome | Apr. 4, 1961 |

FOREIGN PATENTS

| | | |
|---|---|---|
| 907,752 | France | July 23, 1945 |